United States Patent Office 3,309,270
Patented Mar. 14, 1967

3,309,270
ORGANIC PHOSPHORUS ANTHELMINTICS AND METHOD OF USING THE SAME
Milon W. Bullock and Irwin B. Wood, Hopewell, N.J., assignors to American Cyanamid Company, Stamford, Conn., a corporation of Maine
No Drawing. Filed Feb. 11, 1963, Ser. No. 257,760
10 Claims. (Cl. 167—53)

This invention relates to new compositions of matter. More particularly, it relates to the use of meta substituted sulfamoylphenyl dialkyl esters of organic phosphates.

Losses due to helminth infections in farm and domestic animals annually amounts to millions of dollars, safe, effective drugs useful in combating such infections are very much in demand. While anthelmintics are presently available, there is no drug available which is entirely satisfactory. Many anthelmintics, while effective, do not have as wide a margin of safety as is desirable for a product employed in the treatment of a variety of animals of substantially different weights and sizes. Other anthelmintics, while effective against either the adult or larval stage of various helminths, are rarely effective against both stages.

We have now found that compositions containing compounds of the following formula are useful in control and treatment of helminthiases in warm-blooded animals:

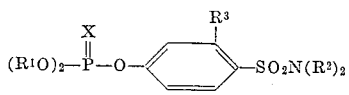

wherein $R^1$, $R^2$ and $R^3$ are lower alkyl radicals, and X is a sulfur or oxygen atom.

It is unexpectedly surprising to discover that the compounds of the present invention have a margin of safety as much as 33 times that of related compounds such as, for example, related compounds in which $R^3$ is hydrogen; that the compounds are highly effective against both adult and larval stages of helminths; and that they are highly effective when administered orally. Furthermore, it has been found that the compounds of the present invention may be administered to animals in their feed, by tablet, capsule or the like, or by parenteral injection. While such routes of administration may be used for treating animals under farm conditions, it is most desirable to provide the medication in the animal feed since this eliminates the necessity of treating each animal individually. However, since efficacy is usually dependent upon dosage on a relative and not an absolute animal weight basis, i.e., upon mg. of drug/kg. of animal body weight, and since individual animal weights may vary by at least twofold or more for a group of animals of the same age group, the necessity of employing a drug with a high margin of safety is essential. Thus there are great advantages in the use of compounds of the present invention. Additionally, it is well-known that there is very considerable variability in susceptibility of different individuals of identical weight to the toxic side effects of various anthelmintic agents, which further emphasizes the advantage of agents with wider margins of safety. Although compounds with narrower margins of safety are useful for many applications where good helminth control can be obtained with a single treatment, or a series of single treatments at, e.g., monthly intervals, there are many other situations which require numerous repeated treatments or even continuous treatment is essential to obtain good helminth control. In order to obtain good control with compounds of the present invention, from 10 mg./kg. to 1000 mg./kg. of animal body weight has been found to be effective and the preferred and most desirable range has been found to be 20 mg./kg. to 500 mg./kg. of body weight.

As indicated above, the anthelmintics of the present invention may be administered orally or parenterally. When given orally, they may be in any convenient and customary oral form of medication such as a capsule, tablet or as a drench. These anthelmintics may be incorporated in the animal's feed or drinking water. If desired, the compounds may be introduced into the body of the animal by hypodermic or intramuscular injection. In special circumstances where the compounds are absorbed through the skin, dips or sprays may be used. The manner of administration of the compounds is not particularly important so long as the prescribed amounts of the compounds are introduced into the body of the animal where it may be distributed throughout the body by the action of the circulatory system.

In general, the compounds forming the active component of the present invention may be prepared by reacting an appropriate benzene sulfonate, e.g., potassium 2-methyl-4-hydroxybenzene sulfonate with acetic anhydride to form the corresponding acetoxy sulfonate which is then reacted with phosphorous pentachloride to produce a corresponding sulfonylchloride, e.g., 4-acetoxy-2-methylbenzene sulfonylchloride. This compound is then reacted with a suitable dialkylamine, e.g., dimethyl, diethyl, dipropyl or dibutylamine to form an N,N-dialkyl-4-hydroxy - 2 - methylbenzene sulfonamide. This compound is subsequently reacted with a suitable dialkylphosphorochloridothionate under alkaline conditions to form the desired corresponding sulfamoylphenyl ester of phosphorothioic or phosphoric acid.

In the present specification and claims the term "lower alkyl" is intended to cover those having 1 to 4 carbon atoms.

The invention will be described in greater detail in conjunction with the following specific examples which describe the preparation of representative compounds forming the active component of the present compositions and the activity of these compositions in various animals.

EXAMPLE I

The decreased toxicity to mammals of the active components of the following generic formula is shown in the accompanying Table I. Compared to similar compounds without a methyl substituent on the benzene ring, compounds with such a substituent appear considerably safer and some are more than 5 to more than 33 times as safe.

In these tests, compounds to be tested are suspended in water and orally administered to mice and rabbits at various dosage levels. The $LD_{50}$ for mice and the minimal lethal dose for rabbits are determined and are provided in Table I below.

TABLE I.—INCREASED SAFETY OF THE ACTIVE COMPONENTS OF THE PRESENT INVENTION OVER CORRESPONDING COMPOUNDS WHEREIN $R^3$ IS HYDROGEN

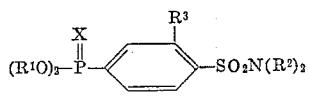

| Compound | $R^1$ | X | $R^2$ | $R^3$ | Mouse, Single Oral $LD_{50}$, mg./kg. | Rabbit, Minimal Lethal Oral Dose, mg./kg. | Increased Safety [a] |
|---|---|---|---|---|---|---|---|
| A | $CH_3$ | S | $CH_3$ | $CH_3$ | >1,000 | >900 | >12  >33 |
| $A^1$ | $CH_3$ | S | $CH_3$ | H | 30 | 75 | |
| B | $CH_3$ | O | $CH_3$ | $CH_3$ | 38 | >100 | 2  >10 |
| $B^1$ | $CH_3$ | O | $CH_3$ | H | 18 | 10 | |
| C | $CH_3$ | S | $C_2H_5$ | $CH_3$ | >2,000 | >1,000 | >2  >5 |
| $C^1$ | $CH_3$ | S | $C_2H_5$ | H | 375 | 500 | |

[a] Increased safety over compound in which $R^3$ is H, by order of magnitude and not mammalian species.

EXAMPLE II

In this test, six-week old rabbits are orally inoculated with about 2000 larvae of the economically important sheep nematode *Trichostrongylus colubriformis* (the bankrupt worm). The rabbits are then held for three weeks in order to permit the infection to mature, and an egg count in the rabbit feces is made to insure that the infection has taken. Compounds to be tested are suspended in water and administered orally through a stomach tube to infected rabbits. Four days after the treatment the rabbits are sacrificed and their intestinal tracts removed. The contents of the intestinal tracts are examined and the efficacy of the drugs tested determined by comparing the number of worms in treated and untreated animals. The therapeutic index or margin of safety is determined by comparing the effective dose with the minimal lethal dose. The anthelmintic action of the subject compounds and their significantly increased therapeutic indices over the compounds in which $R^3$ is H, are clearly illustrated in Table II below. It will also be noted that in this test system, compounds where $R^3$ is H have low therapeutic indices, but that the indices are substantially improved in compounds of this invention. For compounds shown in Table II, this rabbit test is very severe, since Compound A', whose margin of safety is very narrow in the rabbit against *T. colubriformis*, has a useful margin of safety in the sheep against this parasite. The greater safety of Compounds A, B and C in the rabbit indicates that they will be even more useful in the sheep.

EXAMPLE III

In these tests white mice are orally inoculated with ±100 infective eggs of *Aspiculuris tetraptera*. The mice are given a commercial mash laboratory diet and permitted to feed *ad libitum* for three weeks while the eggs mature into adults. Test compounds, in sufficient quantity to produce desired concentrations in the feed, are then admixed with the feed and the mice are permitted to feed *ad libitum* for the following 8 days. One day following the initiation of medicated feed these mice are orally inoculated with approximately 10,000 infective eggs of swine ascarid *Ascaris suum*. Seven days after inoculation with the infective eggs of *Ascaris suum* the mice are killed. Their lungs, liver and intestines are removed and examined; lung and liver for pathological changes due to larval ascarids and their intestines for the number of adult Aspicularis worms present. The results of these tests, which appear in Table III below clearly demonstrate the effectiveness of the compounds of the present invention against the larval stages of *Ascaris suum* and the adult *Aspiculuris tetraptera*. No toxicity is seen with the anthelmintically effective concentrations.

TABLE II.—EFFICACY AGAINST THE SHEEP NEMATODE, TRICHOSTRONGYLUS COLUBRIFORMIS, IN RABBITS OF COMPOUNDS OF THE PRESENT INVENTION AND COMPARISON THEREOF WITH SIMILAR UNSUBSTITUTED COMPOUNDS

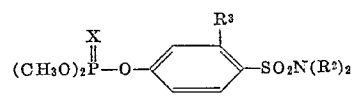

| Compound | X | $R^2$ | $R^3$ | Minimal Lethal Dose, mg/kg. | >70% Helminth Removal, mg/kg. | Therapeutic Index [a] |
|---|---|---|---|---|---|---|
| A | S | $CH_3$ | $CH_3$ | >1,000 | 100 | >10 |
| A' | S | $CH_3$ | H | 75 | 60 | 1.25 |
| B | O | $CH_3$ | $CH_3$ | >100 | 50 | >2.0 |
| B' | O | $CH_3$ | H | 10 | >10 | <1.0 |
| C | S | $C_2H_5$ | $CH_3$ | >1,000 | 500 | >2 |
| C' | S | $C_2H_5$ | H | 500 | >250 | <1.0 |

[a] Minimal Lethal Dose in Rabbits ÷ Effective Anthelmintic Dose.

TABLE III.—EFFICACY AGAINST LARVAL AND ADULT STAGES OF HELMINTHS

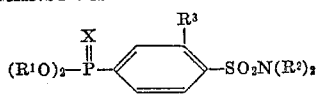

| Compound | $R^1$ | X | $R^2$ | $R^3$ | *Aspiculuris tetraptera* Percent Compound In Diet | *Aspiculuris tetraptera* Avg. No. Adult Worms | *Ascaris suum* Percent Compound In Diet | *Ascaris suum* Avg. No. Larvae Per Mouse | Avg. Lung Lesions |
|---|---|---|---|---|---|---|---|---|---|
| A | $CH_3$ | S | $CH_3$ | $CH_3$ | .05 / 0.025 | 0 / 0 | 0.1 | 1.0 | None. |
| C | $CH_3$ | S | $C_2H_5$ | $CH_3$ | 0.1 | 0 | 0.1 | 4.0 | Do. |
| Control | | | | | 0.0 | >20 | 0.0 | 270 | Severe. |

EXAMPLE IV

*Preparation of 4-hydroxy-2-methyl-N,N-diethylbenzene sulfonamide*

A stirring solution of 540.7 g. (5 moles) of m-cresol in 2500 ml. carbon tetrachloride is treated at −15° C. with 582.6 g. (5 moles) of chlorosulfonic acid. The solidified product is filtered off and rearranged by heating several hours at 110° C. in an oil bath. A four mole aliquot of the oil is converted to the barium salt by pouring into a hot aqueous solution of 631 g. (2 moles) of barium hydroxide octahydrate. The mixture is allowed to cool and the precipitated salt filtered off. The salt is extracted with 1500 ml. of hot water and filtered. The undissolved material (barium 2-hydroxy-4-methylbenzene sulfonate) weighs 419 g. (0.95 mole of salt). The mother liquors from the preparation of this salt are combined and 292 g. (2.11 moles) of potassium carbonate is added. The mixture is heated to boiling and the precipitated barium carbonate filtered off. The filtrate is concentrated to a low volume and allowed to cool. The crystalline product potassium 4-hydroxy-2-methylbenzene sulfonate is filtered off and washed with cold water.

A mixture of 143 g. (0.66 mole) potassium 4-hydroxy-2-methylbenzene sulfonate, 200 ml. acetic anhydride, 300 ml. acetic acid and 0.5 ml. pyridine is refluxed two hours and left standing overnight. The solvents are removed under the reduced pressure of a water aspirator with a rotary evaporator. The residue is dried and combined with 164 g. (0.79 mole) phosphorous pentachloride. The reaction mixture is heated on the steam bath two hours and left standing overnight. The reaction mixture is poured into a mixture of ice and water. The sulfonylchloride is extracted with toluene. The toluene solution is dried over magnesium sulfate and the solvent evaporated. The oily residue is distilled and the fractions distilling 137°–138.5° C. at 0.4 mm. collected as product. The product has $n_D^{25}$ 1.5477.

A solution of 24.8 g. (0.10 mole) of 4-acetoxy-2-methylbenzene sulfonyl chloride in approximately 200 ml. of dry ether is stirred mechanically and cooled in an ice bath while 14.63 g. (0.20 mole) of diethylamine is added from a dropping tunnel. The precipitate is filtered off and washed with ether. The ether filtrate is evaporated leaving an oil which is not purified but hydrolyzed on the steam bath with excess sodium hydroxide. The basic solution is cooled and extracted with ether to remove a small amount of insoluble material. The product is recovered from the water layer by acidifying and extracting with ether. Evaporation of the dried sodium sulfate ether extract left an oil which crystallizes when triturated with cyclohexane to yield the amide, melting point 69–70.5° C. An aliquot recrystallized from an ether-hexane mixture melted 71–72° C.

EXAMPLE V

*Preparation of phosphorothioic acid, O,O-dimethyl-O-(3-methyl-4-N,N-diethylsulfamoyl)-phenyl ester*

A mixture of 12.45 g. (0.0513 mole) of 4-hydroxy-2-methyl-N,N-diethylbenzene sulfonamide and 25.7 ml. (0.0513 mole) of 2N sodium hydroxide is stirred until most of the solid material has dissolved, and then 16.4 g. (0.1026 mole) of dimethylphosphorochloridothionate is added all at once. The reaction is stirred with an efficient stirrer and sodium hydroxide solution is added intermittently to maintain a pH between 9.5 and 10.0. Enough acetone is added shortly after the reaction is started to obtain a homogenous reaction mixture and additional acetone is added during the course of the reaction to prevent the separation of a second phase. After stirring at about 45° C. for seven hours, the reaction is estimated to be 91% complete, based on the base consumed. The reaction mixture is buttered with solid sodium bicarbonate and left stirring overnight. The product is dissolved in ether. The ether solution is washed with water and dried over sodium sulfate. Evaporation of the ether leaves 16.5 g. (0.045 mole), 88% of crude oily material. The product is purified by molecular distillation at 0.001 mm. pressure and a temperature of 110° C. The distilled material having an $n_D^{25}$ 1.5349–1.5360 is obtained.

EXAMPLE VI

*Preparation of N,N-dimethyl-4-hydroxy-2-methylbenzene sulfonamide*

A solution of 12.4 g. (0.05 mole) of 4-acetoxy-2-methylbenzene sulfonyl chloride in approximately 200 ml. of ether is stirred mechanically and cooled in an ice bath while gaseous dimethylamine is passed into the solution until an excess of the amine is present. A solid phase is filtered off and washed with ether. Evaporation of the ether leaves no residue. The solid is taken up in water and acidified. The product is extracted with ether and the ether evaporated leaving 7.65 g. (0.0356 mole), 71.4% of amide, melting point 74–75° C. An analytical sample, melting point 75.5–76° C. is obtained by recrystallizing an aliquot twice from an ether ligroin mixture.

EXAMPLE VII

*Preparation of phosphorothioic acid, O,O-dimethyl-O-(3-methyl-4-N,N-dimethylsulfamoyl)-phenyl ester*

A 500 ml. round bottom flask, equipped with an efficient vibrating-type stirrer is charged with 6.9 g. (0.032 mole) of N,N-dimethyl-4-hydroxy-2-methylbenzene sulfonamide, 13.2 g. (0.096 mole) of anhydrous potassium carbonate, 100 ml. of water and 100 ml. of acetone. The reaction mixture is stirred a few minutes to obtain an homogenous solution and 10.27 g. (0.064 mole) of dimethylphosphorochloridothionate is added all at once. The mixture is left stirring overnight (16 hours). The product is recovered by two extractions with ether. The combined ether extracts are washed with water, potassium carbonate solution and again with water. The ether solution is dried over sodium and magnesium sulfates and evaporated. This gives a crude product of melting point 70.5–72.° C. After slurrying with ether and filtering, there remains a white crystalline product, melting point 71.5–72° C. An analytical sample, melting point 72.5–73° C. is obtained by recrystallizing a small amount from ether.

EXAMPLE VIII

*Preparation of phosphoric acid, O,O - dimethyl - O - (3-methyl-4-N,N-dimethylsulfamoyl)-phenyl ester*

A mixture of 10.8 g. of 4-hydroxy-2-methyl-N,N-dimethylbenzene sulfonamide and 2.05 g. of sodium hydroxide in aqueous mixture is stirred until most of the solid dissolves and the corresponding sodium salt is produced. The salt is then slurried in 100 ml. of methyl cyanide and refluxed at 81° C. The heat is turned off and 7.98 g. of dimethylphosphorochloridate slowly added at a rate that reflux continues. The mixture is heated again for 10 minutes and then cooled and stripped. The product is poured into 500 ml. of ethyl ether and the phosphate dissolves. This solution is filtered and stripped leaving 16.0 g. of crude material. The product purified by molecular distillation at 0.001 mm. pressure and a temperature of 150° C. yields material having $n_D^{25}$ 1.5046.

We claim:

1. A method for controlling helminths in warm blooded animals which comprises treating said animals with an anthelmintic composition comprising an inert carrier and an anthelmintically effective amount of a compound of the formula:

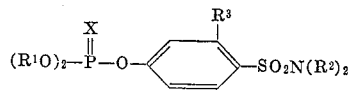

wherein $R^1$, $R^2$ and $R^3$ are lower alkyl and X is a member selected from the group consisting of sulfur and oxygen.

2. A method according to claim 1 in which the active compound is phosphorothioic acid, O,O-dimethyl-O-(3-methyl-4-N,N-diethylsulfamoyl)-phenyl ester.

3. A method according to claim 1 in which the active ingredient is phosphorothioic acid, O,O-dimethyl-O-(3-methyl-4-N,N-dimethylsulfamoyl)-phenyl ester.

4. A method according to claim 1 in which the active ingredient is phosphoric acid, O,O-dimethyl-O-(3-methyl-4-N,N-dimethylsulfamoyl)-phenyl ester.

5. A method according to claim 1 wherein the carrier is animal feed.

6. A composition of matter for controlling helminths in warm-blooded animals which comprises an animal feed for said animals and as the essential active ingredient an anthelmintically effective amount of a compound of the formula:

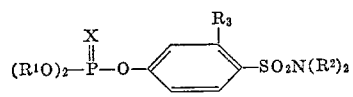

wherein $R^1$, $R^2$ and $R^3$ are lower alkyl and X is a member selected from the group consisting of sulfur and oxygen.

7. A composition according to claim 6 in which the active ingredient is phosphoric acid, O,O-dimethyl-O-(3-methyl-4-N,N-diethylsulfamoyl)-phenyl ester.

8. A composition according to claim 6 in which the active ingredient is phosphorothioic acid, O,O-dimethyl-O-(3-methyl-4-N,N-dimethylsulfamoyl)-phenyl ester.

9. A composition according to claim 6 in which the active ingredient is phosphoric acid, O,O-dimethyl-O-(3-methyl-4-N,N-dimethylsulfamoyl)-phenyl ester.

10. A composition of matter for controlling helminths in warm-blooded animals which comprises an animal feed for said animals and an anthelmintically effective amount of phosphorothioic acid, O,O-dimethyl-O-(3-methyl-4-N,N-dimethylsulfamoyl)-phenyl ester.

References Cited by the Examiner
UNITED STATES PATENTS
3,172,804  3/1965  Cannon _____ 167—30

JULIAN S. LEVITT, *Primary Examiner.*

SAM ROSEN, *Examiner.*

UNITED STATES PATENT OFFICE
CERTIFICATE OF CORRECTION

Patent No. 3,309,270         March 14, 1967

Milon W. Bullock et al.

It is hereby certified that error appears in the above numbered patent requiring correction and that the said Letters Patent should read as corrected below.

Columns 3 and 4, lines 3 and 4, the formula should appear as shown below instead of as in the patent:

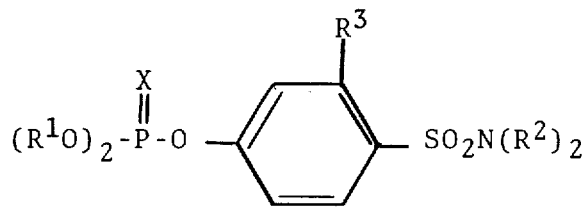

column 4, lines 59 to 63, the formula should appear as shown below instead of as in the patent:

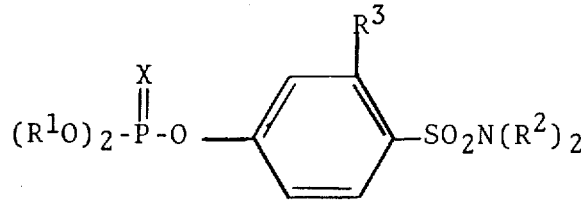

Signed and sealed this 7th day of November 1967.

(SEAL)
Attest:

EDWARD M. FLETCHER, JR.       EDWARD J. BRENNER
Attesting Officer          Commissioner of Patents